United States Patent Office 2,713,016
Patented July 12, 1955

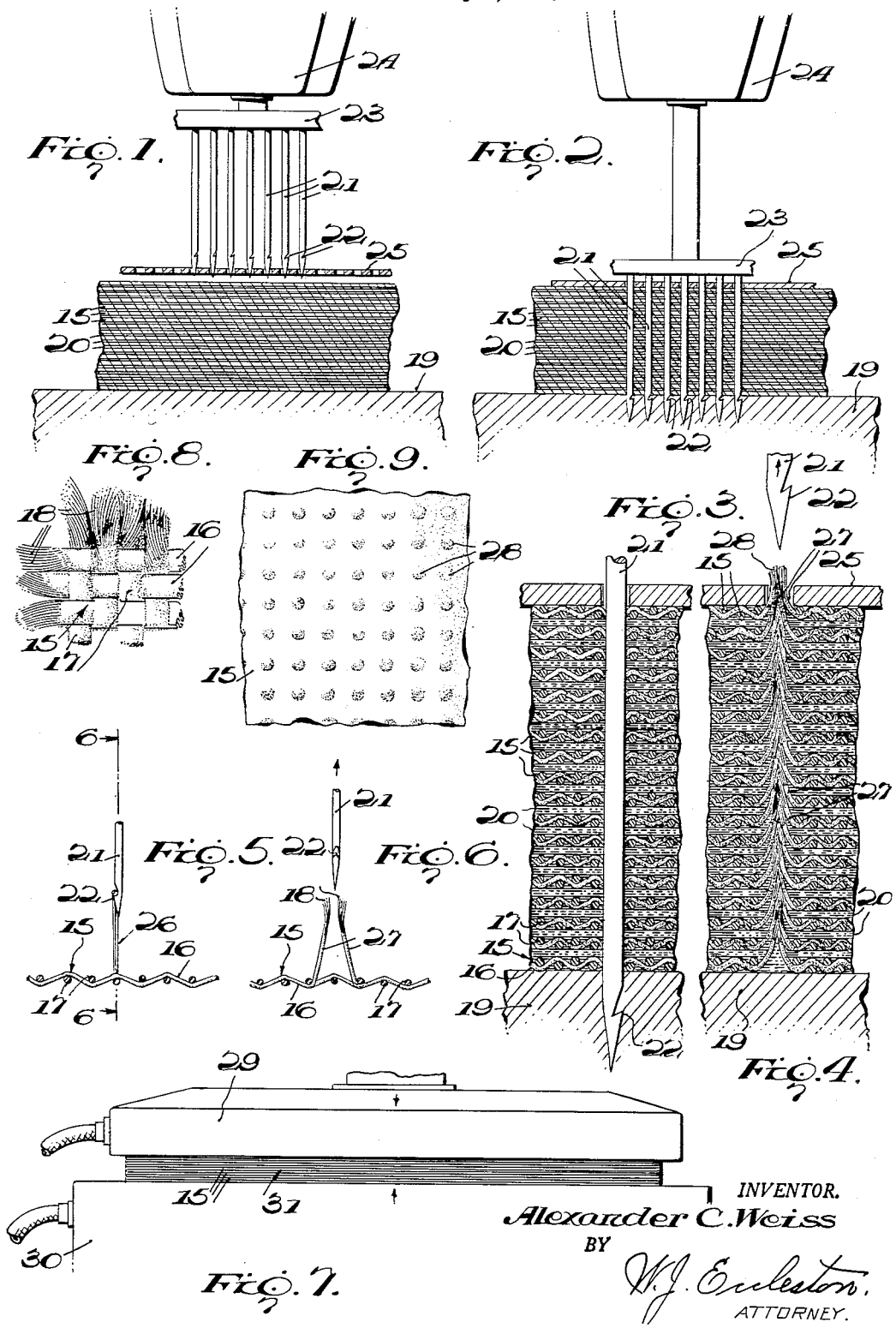

2,713,016
LAMINATED ARTICLE AND METHOD OF MAKING SAME

Alexander C. Weiss, Takoma Park, Md.

Application May 5, 1953, Serial No. 353,248

10 Claims. (Cl. 154—122)

(Granted under Title 35, U. S. Code (1952), sec. 266)

The invention described herein, if patented, may be manufactured and used by or for the Government for governmental purposes, without the payment to me of any royalty thereon.

My invention relates to a laminated article, and method of making the same.

An important object of the invention is to provide rigid, lightweight laminated material for various uses, which material has extremely high resistance to lateral sheer and delamination, due to bending or the like.

A further object of the invention is to provide rigid, lightweight laminated material having regions which are bonded or secured together in a manner which greatly increases the strength of the material as a whole, and prevents peeling or delaminating of the layers of the material to a much greater extent than conventional laminated constructions of the general character involved in the invention.

A further object is to provide an improved method of laminating woven fabric layers or plies with thermosetting plastics material or the like.

A further object is to provide a rigid lightweight laminated article, wherein localized areas of the article are bound together in an extremely strong manner so that the article will have a very high resistance to delaminating or separation.

A further object is to provide a method of laminating woven fiberglas layers or plies with a plasticized thermosetting resin, so that localized areas of the laminated material are treated so as to form columns or "rivets" made up of broken strands or woven fiberglas and thermosetting resin, which penetrates the strands by capillary action, or the like.

A still further object is to provide a method of laminating woven fabric layers with thermosetting plastics material which comprises penetrating the layers of woven fabric, and then pulling certain of the threads or strands of the fabric through the penetrated regions until they are broken or severed, to expose their internal fibers, which then receive the thermosetting plastics material by capillary action, for forming columns or "rivets" through the material.

Other objects and advantages of the invention will be apparent during the course of the following description.

In the accompanying drawings, forming a part of this application, and in which like numerals are employed to designate like parts throughout the same, Figure 1 is a side elevation, partly diagrammatic, of apparatus used in the practice of my method and showing a step in the method, Figure 2 is a similar side elevation showing a further step in the practice of the method, Figure 3 is a greatly enlarged fragmentary vertical section through the apparatus and material used in the practice of the method and further illustrating a step of the method, Figure 4 is a similar enlarged fragmentary vertical section illustrating the formation of a column or "rivet" through the laminated material consisting of severed strands of the woven fabric and thermosetting plastics material.

Figure 5 is a partly diagrammatic side elevation of a layer or ply of woven fabric embodied in the laminating process being acted upon by a barbed needle for pulling a loop formed of a thread or strand of the material through a punctured portion of the material, Figure 6 is a similar diagrammatic view showing the loop severed by the barbed needle for exposing the internal fibers of the strand or loop, Figure 7 is a side elevation, partly diagrammatic of heating or molding apparatus used in the practice of the method for laminating the material together in its final form, Figure 8 is a greatly enlarged fragmentary plan view of a layer or ply of the woven fabric employed in the laminated material, and, Figure 9 is a fragmentary plan view on an enlarged scale of the completed laminated material made by the practice of my method.

In the drawings, where for the purpose of illustration is shown a preferred embodiment of the invention, the numeral 15 designates layers or plies of woven fabric, such as woven fiberglas, or the like. Each woven ply 15 comprises warp and woof strands or threads 16 and 17, interlaced in the usual manner, and each of the warp and woof threads preferably consists of approximately 204 individual strands or filaments 18, shown diagrammatically in the greatly enlarged view in Figure 8. Although I have chosen a particular form of woven fiberglas for use in connection with my method, it should be understood that other types of woven fabric may be employed in the practice of the method, if desired, and I do not wish to restrict the invention to the particular woven fabric shown and described.

In the practice of the method, the layers or plies 15 of woven fiberglas are arranged in superposed stacked relation upon a bed 19 of cork or like material. In practice, I prefer to employ about 18 of the fabric layers 15, although the number of layers may be varied as found desirable. The fabric layers 15 are preferably thoroughly impregnated and coated upon their opposite faces with a suitable thermosetting binder, such as a polyester resin, or the like, and this material preferably forms alternate thin layers 20 between the layers 15 of woven fiberglas, as best shown in Figures 3 and 4. The thermosetting resin forming the layers 20 is applied to the fabric layers 15 in a plasticized or unhardened state, and the resulting assembly or layup is supported by the cork bed 19, as shown in the drawing.

The layup of the fabric layers and thermosetting resin is now pierced or penetrated at a plurality of spaced points over its area by a bank of barbed needles or penetrating elements 21 having upwardly directed barbs 22 near and above their lower pointed ends. The needles 21 are secured in any desired manner to a horizontal support plate or holder 23, in turn secured within a chuck 24 of a vertical drill press, or the like. Any preferred number of the needles 21 may be employed in the bank of needles, and if preferred, each needle 21 may be provided with additional upwardly directed barbs 22, rather than a barb, as shown in the drawings for the purpose of illustration only. Obviously, where a larger number of the needles 21 are employed in the bank of needles, a greater area of the material will be pierced or punctured by the needles when the drill press chuck 24 is shifted downwardly so that the needles pass through the material in a manner to be described. The needles 21 of the bank of needles are preferably arranged in equidistantly spaced rows, with the needles of each row equidistantly spaced so that the layup of material will be pierced by the needles at a plurality of equidistantly pierced points, and preferably in a rectangular pattern, as best shown in Figure 9. The relative spacing between the needles 21 may be varied somewhat as desired, but I prefer to arrange the needles for piercing through the layup of material at approximately 50 points per square inch of the material. There need be no particular corelation or orienting of the needles 21 with respect to the warp and woof threads 16 and 17 of the fabric layers, and the needles may penetrate the layup of material in any chosen locality or area of the same, chosen at random. Obviously, the size or area of the layup may be varied as found practical in the practice of the method, and the layup is repeatedly pierced by the bank of needles until the same is punctured or pierced uniformly over substantially its entire area.

As shown particularly in Figures 2 and 3, the needles 21 are shifted downwardly and pass entirely through all of the fabric layers 15 and the alternate layers 20 of thermosetting resin, and the lower pointed ends of the needles and their barbs 22 preferably penetrate into the cork bed 19 below the layup, as shown. The upwardly directed barbs 22 have no particular effect upon the woven fabric layers when the needles 21 are shifted downwardly through the layup, and the needles merely force or punch their way through the layup by spreading apart certain of the warp and woof threads 16 and 17, and possibly by puncturing through certain of the warp and woof threads.

In the next step of the method, the bank of needles 21 are elevated with preferably a fast or quick action, as compared to their speed of descent, and the needles at this time are entirely withdrawn from the layup of material as best shown in Figure 4. A hold down or presser plate 25, forming a part of the apparatus engages the top of the layup at this time to hold the layup down against the cork bed 19, and prevent its rising with the needles 21. When the needles are quickly withdrawn, as stated, certain of the warp and woof strands 16 and 17 of each woven layer 15 are snagged and pulled upwardly through the punctured regions of the material, by the upwardly directed barbs 22. This action of the needles causes loops 26 of considerable length, see Figure 5, to be pulled upwardly through the punctured regions of the layup and subsequently broken or severed as shown in Figure 6 to form individual strands 27 having their internal fibers or filaments 18 exposed and somewhat unraveled. The arrangement is such, that the upwardly directed severed strands 27 extend more or less continuously in overlapping relation throughout the entire vertical thickness of the layup, Figure 4. The severed strands 27 pulled from the uppermost layers 15 of the layup may actually project somewhat above the top face of the layup to form small tufts 28 on top of the layup, as shown in Figure 4.

Upon severing the loops 26 to form the upwardly directed strands 27, having their fibers 18 exposed, the plasticized thermosetting resin 20 will thoroughly penetrate into the fibers 18 of the strands 27 by capillary action, and in a relatively short time, the punctured regions of the layup will be filled with columns or "rivets" formed of the strands 27 and the plasticized resin.

After this has occurred, the layup is subjected to controlled heat and pressure between heated pressure plates 29 and 30, Figure 7, and the thermosetting resin is hardened or solidified for permanently laminating the fabric layers 15 together into the finished flat, rigid, lightweight laminated article or panel 31. I prefer to mold the layup in the manner shown diagrammatically in Figure 7 under a pressure of approximately five pounds per square inch at a temperature of approximately 290° F. although these figures may be varied somewhat as found desirable.

The molding step binds or laminates the fabric layers 15 together over their entire areas, and forms in the punctured regions of the material substantially homogeneous and continuous columns of hardened thermosetting plastics material and strands 27, these columns functioning like rivets to bind the laminated layers 15 securely together and greatly increasing the resistance of the material to delamination at the several punctured regions of the same. I have found through actual laboratory tests, that the laminated material formed by the practice of my method, as described above, materially increases the resistance of the material to delamination or separation due to bending stresses and the like, and the material has a greatly increased resistance to lateral sheer, as compared to materials which are laminated by conventional processes.

When the material is pressed or molded in the final step in the method, the small tufts 28 are merely pressed flat against the top surface of the material, and subsequently stick to the top surface which becomes flat and smooth during the molding operation.

While I have shown and described my method as embodying the layers 15 of woven fabric, such as woven glass fabric, it is entirely feasible to employ various types of woven material in the layers 15, such as woven cotton fabric, or the like. If desired, the layers 15 may be unwoven layers or sheets of fibrous material having their threads or fibers merely matted together and arranged at random. Such unwoven fibrous layers may be formed of fiberglas, cotton or the like.

Also, the binding or laminating plastics material need not necessarily be a thermosetting plastics material, such as a thermosetting resin, and if desired, the method may be successfully practiced by using a binding material which will harden at room temperature, or one which may be cold molded. If preferred, the layers 15 may be laminated with a suitable thermoplastic material, instead of a thermosetting material.

I believe that the laminated material made in accordance with my method is capable of a wide variety of industrial applications, such as the making of high strength laminates for the aircraft industry.

The finished product is a rigid lightweight laminated structural panel which may be flat, and the same is materially reinforced or strengthened against delamination by a multiplicity of continuous internal reinforcing columns or "rivets," formed by the severed threads or fibers which become impregnated with the hardenable plastic binder.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of making a rigid lightweight laminated panel comprising forming a layup of a plurality of woven fabric layers impregnated with a thermosetting plastics material in the plasticized state, puncturing through the layup in one direction at a plurality of spaced points, snagging threads of the woven fabric layers and pulling them through the punctured regions of the layup in the opposite direction to which it was punctured, severing the snagged threads within the punctured regions to expose their internal fibers, whereby the plasticized thermosetting material penetrates into the fibers of the severed threads and forms therewith substantially continuous reinforcing columns through the layup, and then applying heat and pressure to the layup to cause hardening of the thermosetting plastics material for completing the panel.

2. A method of making a rigid lightweight panel comprising forming a layup of a plurality of woven fiberglas layers impregnated with a thermosetting resin in the plasticized state, puncturing through the layup in one direction at a plurality of points, drawing certain of the threads forming the woven fiberglas layers through the punctured regions of the layup in the opposite direction to which it was punctured for substantial distances, severing the threads within the punctured regions of the layup to expose their internal fibers, whereby the plasticized resin penetrates into the threads and forms therewith substantially continuous reinforcing columns through the layup at the punctured regions thereof, and then applying heat and pressure to the layup to cause hardening of the thermosetting resin.

3. A method of making a rigid lightweight laminated panel comprising arranging a plurality of fabric layers in stacked relation with a plasticized thermosetting material between the layers, puncturing through all of the layers in one direction at spaced points with barbed needles, withdrawing the barbed needles from the layers and thereby snagging certain threads of the fabric layers and pulling the threads through the punctured regions of the layers in the opposite direction to which they were punctured to form loops within the punctured regions of the layers, severing the loops within the punctured regions and thereby exposing the internal fibers of the threads so that the plasticized material by capillary action penetrates into the fibers of the threads and forms therewith continuous reinforcing columns through the material at the punctured regions, and then applying heat and pressure to the stack of fabric layers to cause hardening of the thermosetting material and laminating of the fabric layers.

4. A method of making a substantially rigid lightweight laminated article comprising arranging a plurality of woven fabric layers in stacked relation with a plasticized thermosetting resin between the layers, puncturing through all of the fabric layers in one direction at spaced points with barbed needles, withdrawing the barbed needles from the layers with a quick action and thereby snagging certain threads of the woven layers and pulling loops of the threads into the punctured regions for substantial distances in the opposite direction to that which the layers were punctured, whereby the plasticized resin penetrates into the loops of thread within the punctured regions, and then applying heat and pressure to the stack of fabric layers to cause the thermosetting resin to harden and bind the layers together over substantially their entire areas and within the punctured regions to form continuous reinforcing columns through the fabric layers consisting of hardened resin and the loops of thread pulled from the layers.

5. A method of making a substantially rigid laminated panel comprising assembling a plurality of woven fabric layers impregnated with a thermosetting resin in stacked relation, needling through the assembled layers in one direction over a substantial area of the same to form a plurality of punctured regions in the assembled layers, drawing threads from the individual fabric layers into the punctured regions of the layers in the opposite direction to which they were punctured for substantial distances and in overlapping relation, whereby the thermosetting resin penetrates said threads and binds them together in substantially continuous reinforcing columns through the punctured regions, and applying heat and pressure to the assembled layers to cause hardening of the thermosetting resin and lamination of said fabric layers.

6. A method of making rigid laminated structural material comprising assembling a plurality of woven fabric layers impregnated with a thermosetting resin in stacked relation, needling through the assembled layers in one direction over a substantial area of the same to form spaced punctured regions in the layers, drawing threads from the individual fabric layers into the punctured regions for substantial distances and in the opposite direction to which they were needled, severing the threads within the punctured regions and allowing the severed threads to become saturated with the thermosetting resin for forming in the punctured regions substantially continuous reinforcing columns extending substantially entirely through the assembled fabric layers, and then applying heat and pressure to the assembled fabric layers to cause hardening of the thermosetting resin.

7. A method of making a rigid laminated panel comprising forming a layup of a plurality of layers of fibrous material impregnated with a hardenable plastics binder in the plasticized state, puncturing through the layup in one direction at a plurality of spaced points, snagging certain fibers of the fibrous layers and pulling them into the punctured regions of the layup for substantial distances in the opposite direction to which they were punctured, whereby the plasticized binder penetrates into said snagged fibers and forms therewith continuous reinforcing columns through the layup in the punctured regions of the layup, and then hardening the plasticized binder to complete the panel.

8. A method of making a laminated structural panel comprising assembling a plurality of layers of fibrous material in stacked relation with the layers impregnated by a hardenable plastics material in the plasticized state, puncturing through the assembled layers at spaced points and snagging fibers of the layers and drawing them through the punctured regions of the layers for substantial distances, severing the snagged fibers within the punctured regions to thereby expose their internal filaments, whereby the plasticized material penetrates into the internal filaments of the severed fibers and forms therewith substantially continuous reinforcing columns through the assembled fibrous layers in the punctured regions of the layers, and hardening said hardenable plastics material to effect the lamination of said fibrous layers.

9. A rigid lightweight structural panel comprising a multiplicity of layers of woven fabric arranged in superposed relation and bonded together by a hardenable plastics material; and a multiplicity of spaced substantially continuous reinforcing columns extending through substantially all of said layers and materially strengthening the panel against delamination, the columns consisting of a multitude of severed fibers snagged from the woven fabric layers and pulled through the panel in one direction and being saturated with the hardenable plastics material with which the layers are impregnated.

10. A substantially rigid lightweight structural panel comprising a multiplicity of layers of woven fiberglas arranged in superposed stacked relation and bonded together by a hardenable thermosetting resin with which the layers are saturated, and a multiplicity of spaced reinforcing columns extending through said panel between opposite faces of the same, said columns consisting of ruptured filaments of fiberglas pulled from said woven fiberglas layers and drawn through the panel in one direction in overlapping relation and being saturated with said resin with which the fiberglas layers are bonded together.

References Cited in the file of this patent

UNITED STATES PATENTS

| | | |
|---|---|---|
| 1,978,620 | Brewster | Oct. 30, 1934 |
| 2,373,033 | Kopplin | Apr. 3, 1945 |
| 2,385,870 | Lashar et al. | Oct. 2, 1945 |
| 2,429,486 | Reinhardt | Oct. 21, 1947 |
| 2,464,301 | Francis | Mar. 15, 1949 |
| 2,488,685 | Riddle | Nov. 22, 1949 |
| 2,557,668 | Lincoln | June 19, 1951 |
| 2,616,482 | Barnes | Nov. 4, 1952 |